Oct. 9, 1962  MASAMI SEIDO  3,058,089
CAMERA SHUTTER CORD HAVING A CHANGEABLE TERMINAL
Filed Dec. 23, 1959
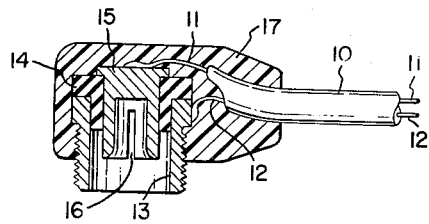
*Fig. 1*
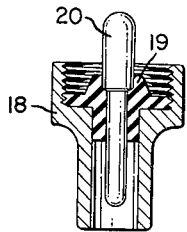  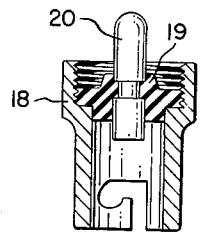
*Fig. 2*  *Fig. 3*
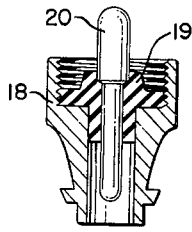  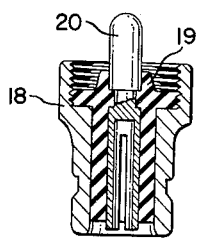
*Fig. 4*  *Fig. 5*
INVENTOR.
MASAMI SEIDO
BY
ATTORNEY

United States Patent Office 3,058,089
Patented Oct. 9, 1962

3,058,089
CAMERA SHUTTER CORD HAVING A CHANGEABLE TERMINAL
Masami Seido, Tokyo, Japan, assignor to Minneapolis-Honeywell Regulator Company, Minneapolis, Minn., a corporation of Delaware
Filed Dec. 23, 1959, Ser. No. 861,672
1 Claim. (Cl. 339—180)

The present invention is concerned with a camera shutter cord and particularly with a camera shutter cord having connector means on one end thereof, which connector means includes a changeable terminal such that a single camera shutter cord, through the medium of a variety of such terminals, may be utilized with a plurality of photographic cameras.

As is well known, the majority of camera manufacturers use only two different basic types of shutter switch connector outlets. These connectors are mounted on the case of the camera and are connected to the internal camera shutter switch. This camera shutter switch is actuated as the shutter of the camera moves to expose the photographic film. The operation of this switch is synchronized with the operation of the shutter to facilitate the energization of a photographic flash unit to illuminate the subject to be photographed. The connector provided on the camera is adapted to be connected to an external photographic flash unit by means of a camera shutter cord of the type disclosed herein.

The two most popular camera connectors are known as the din or European connector, and the bayonet or American connector. Such connectors, while being basically of the din or bayonet type, may take a variety of forms in accordance with various improvements or considerations which have been originated by various camera manufacturers and incorporated into their particular cameras. Since it is not unusual for a photographer to have more than one camera, it is desirable to provide a single camera shutter cord which can be utilized with the photographer's flash unit and with any one of his cameras. In order to accomplish this, replaceable terminals have been provided for these shutter cords each different terminal being tailored to a different type camera connector. However, these replaceable terminals have been for the most part unsatisfactory. For example, it is relatively easy, during use of the cord, to loosen the changeable terminal to the extent that electrical continuity of the circuit is broken.

The present invention is concerned with providing an improved camerta shutter cord having a changeable terminal in which the electrical circuit connection is completed through mating screw threads and through a pin and socket type connection which are related in a specific manner such that good electrical continuity is insured even though the coupling between the threaded portions works loose. The present invention utilizes, in part, a pin and socket type connection in which the engagement of the pin with the socket aligns the screw threads, and in which the rotation of the members to engage the screw threads also causes the pin to rotate within the socket and thereby clean the pin and insure good electrical continuity.

The present invention will be apparent to those skilled in the art upon reference to the following specification, claims, and drawings, of which:

FIGURE 1 is a section view of one end of the improved camera shutter cord, showing the camera connector with a mating portion thereof removed, and FIGURES 2, 3, 4 and 5 show various forms which the changeable mating portion of the connector of FIGURE 1 may take, to adapt the camera shutter cord for use with different camera connectors.

Referring to FIGURE 1, the reference numeral 10 designates a two conductor insulated wire having a pair of electrical conductors 11 and 12. For purposes of simplicity, wire 10 is shown broken away. As is well known, the right-hand end of this shutter cord, not shown, is provided with a connector which is adapted to be connected to a photographic flash unit whereas the left-hand end of the shutter cord, as shown in FIGURE 1, when utilized with one of the terminals of FIGURES 2 through 5, is adapted to be connected to the shutter switch outlet of a camera. In this manner, the shutter operation of the camera, which is effective to expose the film within the camera, is also effective to close the camera shutter switch and a circuit is completed through the camera shutter cord to the photographic flash unit. The photographic flash unit is then energized to produce a sudden burst of light in synchronism with the operation of the shutter of the camera.

Specifically, the portion of the apparatus as shown in FIGURE 1 utilizes a metallic cylindrical shaped member 13 which is hollow and is provided with male screw threads formed on the outside surface thereof. An insulating washer 14 is inserted into the top of cylindrical member 13 and this insulating washer is provided with a centrally located opening which receives and tightly holds a central metallic terminal 15. The lower end of this terminal is formed as a hollow cylinder or cup having a plurality of slits 16 cut in the side thereof such that the internal diameter of the cup can be expanded. Member 15 is in fact the socket of a pin and socket type connector.

The conductors 11 and 12 of wire 10 are connected to terminal 15 and to member 13 respectively. This assembly is then potted or molded in a known manner to secure the members within a protective cover or housing identified by the reference numeral 17. This cover 17 is formed of an insulating material, and, for example, may be a flexible rubber-like material.

FIGURES 2, 3, 4 and 5 show accessory terminals which are each adapted to be selectively used with the arrangement of FIGURE 1. In these figures, identical reference numerals will be used to identify similar parts. Referring specifically to FIGURE 2, reference numeral 18 identifies a further metallic cylindrical member which is hollow and receives a further insulating washer 19. Insulating washer 19 is provided with a central opening which receives and tightly holds a contact member 20 in the form of a pin. The upper end of this contact member, as shown in FIGURE 2, is the pin member of the pin and socket connection 20—15. The upper portion of member 18 is formed with mating screw threads which are adapted to mate with the exterior screw threads formed on member 13 of FIGURE 1.

The lower end of the accessory terminal as shown in FIGURE 2 may be constructed in any manner and it is in this fashion that the accessory terminals shown in FIGURES 2, 3, 4 and 5 differ. The construction of the lower portion of the accessory terminal of FIGURE 2 adapts this terminal for use with the din or European shutter terminal which is provided on a number of cameras. The arrangement of FIGURE 3 is for use with a bayonet or American terminal. The arrangement of FIGURE 4 is a modified din terminal for use with, for example, the Rollei camera; and the arrangement of FIGURE 5 is a further construction for use, for example, with the Leica M3 camera. It will be readily appreciated that it is within the scope of the present invention to provide an accessory terminal to accommodate any of the existing camera shutter terminals.

In actual practice, the photographer selects the accessory terminal which he desires to use and, for example, the accessory terminal of FIGURE 2 is aligned with the mating portion of FIGURE 1 such that pin 20 engages the cylindrical portion of the terminal 15. The upper end of pin 20 is provided with a semi-spherical shape so as to allow the pin to easily enter the socket of member 15 and spread the fingers formed by slits 16. This pin and socket connection 20—15 aligns the threads formed on members 13 and 18 and allows the accessory terminal of FIGURE 2 to be easily screwed into position on the portion of the apparatus shown in FIGURE 1, to thus provide a complete connector for use with cameras having a din type shutter terminal. This pin and socket connection not only provides for easy assembly of the parts, but also insures continuous electrical continuity even though the portion of the connector shown in FIGURE 2 should work loose, provided of course that there still is electrical contact between the members 13 and 18 through the medium of the threads formed on these members. Furthermore, since pin 20 is prevented from rotating within insulator 19, as the accessory terminal of FIGURE 2 is rotated to accomplish full engagement of the threads of the respective parts, pin 20 is also rotated within the socket of member 15 to thereby insure a clean electrical contact between parts 20 and 15. Even though the accessory terminal is initially firmly screwed into position, it is possible during operation of the camera and the associated flash unit that the terminal will work loose. Normally however, the terminal will not work loose more than a turn or so and the threads on the members 13 and 18 remain engaged such that the electrical circuit remains complete through conductor 11 and member 15 to member 20, and through conductor 12 and member 13 to member 18.

From the above it can be seen that I have provided an improved camera shutter cord having a changeable terminal wherein a pin and socket type connection 20—15 is provided to facilitate easy assembly of the parts since the pin and socket connection is placed in engagement prior to the time the threads on the members 13 and 14 engage. The pin 20, by being pushed further into the socket of member 15 brings the thread into proper alignment and the accessory terminal can then be rotated to be firmly mounted on member 13. Furthermore, with the arrangement of the present invention, good electrical continuity, and therefore proper operation of the camera and associated flash unit, is insured even though the accessory terminal should work loose to a certain extent. Other modifications of this invention will be apparent to those skilled in the art and it is therefore intended that the scope of the present invention be limited solely by the scope of the appended claim.

I claim as my invention:

A camera shutter cord having a changeable end terminal to thereby allow the shutter cord to be used with a variety of cameras having different shutter connectors, comprising: a two conductor wire having one end adapted to be connected to a photographic flash unit, a first terminal unit comprising a first hollow metallic member having fine pitch screw threads formed thereon and a second hollow socket type contact member mounted within said first metallic member but insulated therefrom, said second hollow socket contact member having slits cut therein such that the socket diameter may be expanded, means connecting the other end of said wire with one of said conductors connected to said first metallic member and the other of said conductors connected to said second socket contact member, insulating material joining said wire and said two contact members to hold the wire in assembled relation with said first terminal unit and with the axis of said wire perpendicular to the axis of said first and second members, a small removable camera terminal unit constructed for use with the particular camera with which it is intended to be used and including a third hollow metallic member having screw threads formed on a first portion thereof and adapted to mate with the screw threads of said first metallic member and a pin type contact member mounted in said second metallic member, said contact pin being of sufficient length with respect to the threaded portions of said first and third hollow metallic members such that when said removable terminal unit is attached to said first terminal unit said contact pin extends within said second socket member before the threads of said first and third members engage so as to align the threads of said first and third metallic members, the diameter of said contact pin being substantially the same as the diameter of said socket so as to have rubbing electrical engagement with said socket as said first and third members are screwed together by relative rotation thereon, said third hollow metallic member and said pin type contact member each being extended in the opposite direction from their area of engagement with said first terminal unit to provide two connector portions adapted to mate with a camera shutter switch connector.

References Cited in the file of this patent

UNITED STATES PATENTS

| | | |
|---|---|---|
| 1,871,397 | Watts | Aug. 9, 1932 |
| 1,969,345 | Andrews | Aug. 7, 1934 |
| 1,977,378 | Doane | Oct. 16, 1934 |
| 2,546,319 | Richartz | Mar. 27, 1951 |
| 2,748,360 | Schwartz et al. | May 29, 1956 |
| 2,966,645 | Bird et al. | Dec. 27, 1960 |

FOREIGN PATENTS

| | | |
|---|---|---|
| 250,741 | Great Britain | Apr. 22, 1926 |